(12) United States Patent
Takahashi

(10) Patent No.: US 7,614,758 B2
(45) Date of Patent: Nov. 10, 2009

(54) BACKLIGHT FOR COLOR LIQUID CRYSTAL DISPLAY APPARATUS

(75) Inventor: Mitsuasa Takahashi, Kanagawa (JP)

(73) Assignee: NEC LCD Technologies, Ltd., Kanagawa (JP)

(*) Notice: Subject to any disclaimer, the term of this patent is extended or adjusted under 35 U.S.C. 154(b) by 419 days.

(21) Appl. No.: 11/566,130

(22) Filed: Dec. 1, 2006

(65) Prior Publication Data
US 2007/0132676 A1 Jun. 14, 2007

(30) Foreign Application Priority Data
Dec. 2, 2005 (JP) .............................. 2005-349752

(51) Int. Cl.
G01D 11/28 (2006.01)
(52) U.S. Cl. .................. 362/27; 362/601; 362/612; 362/613; 362/616; 362/620; 349/65; 349/68
(58) Field of Classification Search .................. 362/27, 362/601, 612, 613, 616; 349/65, 68
See application file for complete search history.

(56) References Cited
U.S. PATENT DOCUMENTS
6,648,486 B2 * 11/2003 Harbers et al. .............. 362/613
6,854,854 B2 * 2/2005 Hoelen et al. ................. 362/27
2002/0167624 A1 11/2002 Paolini et al.

FOREIGN PATENT DOCUMENTS
JP 2002-196332 A 7/2002

* cited by examiner

*Primary Examiner*—Stephen F Husar
(74) *Attorney, Agent, or Firm*—Sughrue Mion, PLLC

(57) ABSTRACT

A backlight for a color liquid crystal display apparatus includes a first light-guide plate; a first incidence part for receiving light of a first primary color in a first area on a first lateral surface of the first light-guide plate; a second incidence part for receiving light of a second primary color light in a second area on a second lateral surface that is opposite to the first lateral surface of the first light-guide plate; and a third incidence part for receiving light of a third primary color in a third area on a rear surface of the first light-guide plate. The number of superposition steps is thereby reduced, light-guide plates can easily be superposed onto an LCD panel with high accuracy, and a lightweight and inexpensive backlight for a color liquid crystal display apparatus can be obtained.

14 Claims, 5 Drawing Sheets

BACKLIGHT FOR COLOR LIQUID CRYSTAL DISPLAY APPARATUS

BACKGROUND OF THE INVENTION

1. Field of the Invention

The present invention relates to a backlight for a color liquid crystal display apparatus, and specifically relates to a form of backlight that allows three colors of light (R (red), G (green), B (blue)) from a light source to impinge directly on the corresponding pixels of a liquid crystal display panel without passing through a color filter.

2. Description of the Related Art

Along with the development of liquid crystal technology in recent years, liquid crystal display (LCD) modules that use backlights with a light emitting diode (LED) as a light source are being implemented. In most LED backlights, LED light of three colors is mixed in a light guide to become white light, and is combined with a color filter to display color. However, there are problems such as the brightness fading when using a color filter.

In order to improve this problem, Japanese Laid-Open Patent Application No. 2002-196332 discloses a color liquid crystal display apparatus provided with an LED backlight wherein LED light of three colors directly enters the corresponding pixels of the LCD, the light intensity is controlled with a liquid crystal shutter, and color is displayed without using a color filter.

FIG. 1 is a schematic diagram that shows a conventional LED backlight according to FIG. 3 of Japanese Laid-Open Patent Application No. 2002-196332. Light from a red LED 111 is introduced into a light guide 101. Light emitted from a pit or other deformed part 120 passes through a polarizing filter 104 and is incident on a color pixel sequence that corresponds to a TFT (Thin Film Transistor) array 105, as shown in FIG. 1. Similarly, light from a blue LED 112 is introduced into a light guide 102. Light emitted from a deformed part 120 is incident on the color pixel sequence of the corresponding TFT array 105. Light from a green LED 113 also enters a light guide 103 and is incident on the corresponding color pixel sequence of the TFT array 105 from the deformed part 120. Each light guide 101, 102, and 103 therefore has a layered construction.

Conventionally, in order to simultaneously introduce the three colors of light from an LED light source into an LCD panel, the components are aligned and the three light-guide plates superposed on each other so that the light from the each R, G, and B LED light source was directed to the three separate light-guide plates and the light of each color enters the corresponding pixels of the LCD panel, with the three plates stacked up. Therefore, with conventional LED backlights, aligning and superposing each of the three light-guide plates was necessary in order to coordinate the corresponding color pixels of the LCD panel with the light-guide plate thereof. The size of an LCD panel pixel that corresponds to one color is about 100 µm×300 µm, and three pixels lined up have a size of about 300 µm×300 µm. Each pixel displays a single color, and a darkened band having a width of about 15 µm is forms between the pixels. Therefore, an accurate superposition was necessary to obtain the 15 µm width of the darkened band in each light-guide plate and LCD panel, and manufacture was extremely difficult.

SUMMARY OF THE INVENTION

An object of the present invention is to reduce the number of superposition steps, to be able to easily superpose light-guide plates onto an LCD panel with high accuracy, and to provide a light and inexpensive backlight for a color liquid crystal display apparatus.

The backlight for a color liquid crystal display apparatus according to the present invention is that light of the three primary colors of red, blue, and green is directly incident on the corresponding pixels of a liquid crystal layer. The backlight of the present invention comprises a first light-guide plate; a first incidence part for receiving light of a first primary color from among the light of the three primary colors in a first area on a first lateral surface of the first light-guide plate; a second incidence part for receiving light of a second primary color light from among the light of the three primary colors in a second area on a second lateral surface that is opposite to the first lateral surface of the first light-guide plate; and a third incidence part for receiving light of a third primary color from among the light of the three primary colors in a third area on a rear surface of the first light-guide plate.

Also, the first incidence part may have a first light-emitting diode that emits light of the first primary color and is provided to the first lateral surface, and a first light-blocking film provided to an area outside of the first area on the first lateral surface; the second incidence part may have a second light-emitting diode that emits light of the second primary color and is provided to the second lateral surface, and a second light-blocking film provided to an area outside of the second area on the second lateral surface; and the third incidence part may have a second light-guide plate provided to the rear surface of the first light-guide plate, a third light-blocking film provided to an area outside of the third area on the rear surface, and a third light-emitting diode for emitting light of the third primary color toward the second light-guide plate. Furthermore, the light-blocking films include reflective films and other films as films that block light.

Also, the area occupied by light of the first primary color received from the first area, the area occupied by light of the second primary color received from the second area, and the area occupied by light of the third primary color received from the third area in the first light-guide plate are preferably disposed in an alternating fashion parallel to each other in the shape of a band as viewed from the emitting surface.

Directivity of light emitted from the first and second light-guide plates can be enhanced by providing a prism formed by aligning bumps on the surfaces of the first and second light-guide plates, or by providing a prism formed by aligning bumps and dips.

Also, numerous concavities and convexities that scatter light on the surfaces of the first and second light-guide plates are formed and light emitted from the first and second light-guide plates is diffused, whereby the bright spots, dots, bright lines, irregularities, and the like in the light-guide plates can be distributed, the effect thereof can be reduced, and the entire emission surface can be made uniformly bright.

A scattering sheet capable of alternating between a scattering state and a transmitting state depending on an electronic signal can also be formed on the surfaces of the first and second light-guide plates.

The color liquid crystal display apparatus according to the present invention comprises a liquid crystal layer and a backlight for the color liquid crystal display apparatus in which light of the three primary colors of red, blue, and green is directly incident on the corresponding pixels of the liquid crystal layer. The backlight has a first light-guide plate; a first incidence part for receiving light of a first primary color from among the light of the three primary colors in a first area on a first lateral surface of the first light-guide plate; a second incidence part for receiving light of a second primary color light from among the light of the three primary colors in a second area on a second lateral surface that is opposite to the first lateral surface of the first light-guide plate; and a third incidence part for receiving light of a third primary color from among the light of the three primary colors in a third area on a rear surface of the first light-guide plate.

Also, the first incidence part may have a first light-emitting diode that emits light of the first primary color and is provided to the first lateral surface, and a first light-blocking film provided to an area outside of the first area on the first lateral surface; the second incidence part may have a second light-emitting diode that emits light of the second primary color and is provided to the second lateral surface, and a second light-blocking film provided to an area outside of the second area on the second lateral surface; and the third incidence part may have a second light-guide plate provided to the rear surface of the first light-guide plate, a third light-blocking film provided to an area outside of the third area on the rear surface, and a third light-emitting diode for emitting light of the third primary color toward the second light-guide plate. Furthermore, a light-blocking film, such as a film that contains reflective film or the like, is used for each of the light-blocking films.

According to the present invention, light from an LED light source of each of the three primary colors passes through each of the corresponding light guide parts to directly impinge on each of the corresponding pixels of the LCD panel, and therefore a color filter for the LCD panel is not necessary, the transmissivity is improved, and an inexpensive LCD module having high luminance and high efficiency can be obtained. Also, the light-guide plates and LCD panel are only superposed once and can therefore be fit together with high precision. Only one or two light-guide plates are used, resulting in a light weight, a small number of steps, and a high yield.

DESCRIPTION OF THE PREFERRED EMBODIMENTS

Figure 1:
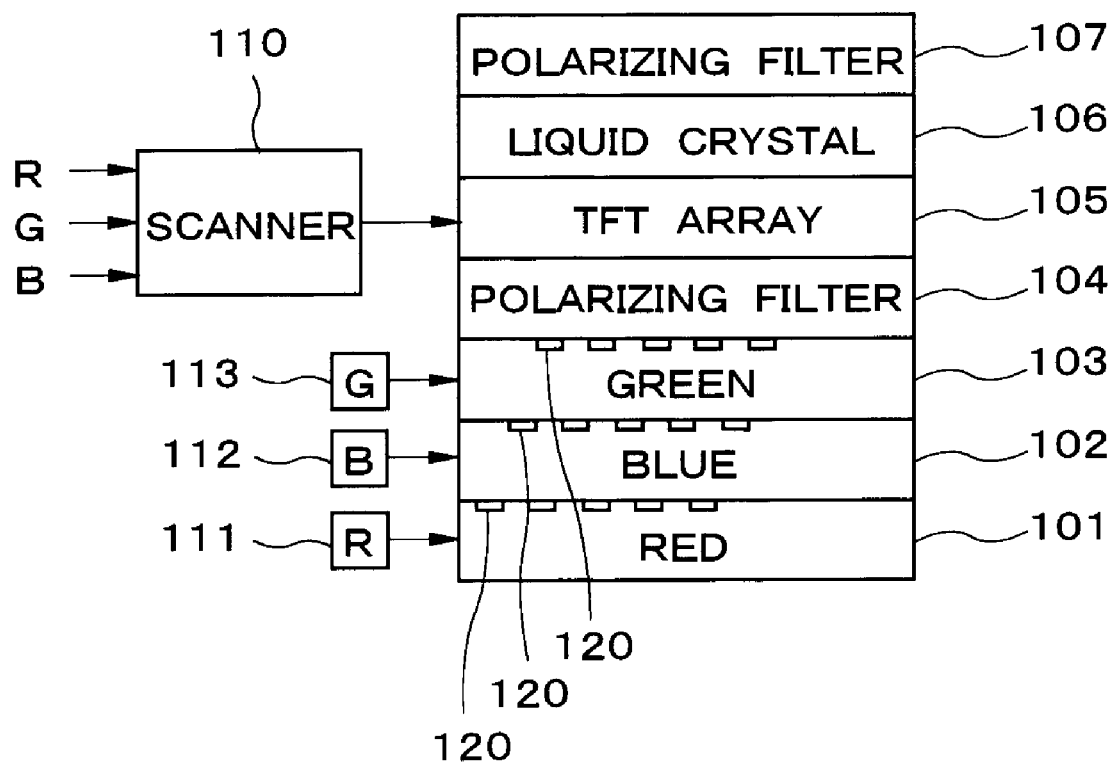
FIG. 1 is a schematic diagram showing a cross-sectional structure of a conventional backlight.
Figure 2:
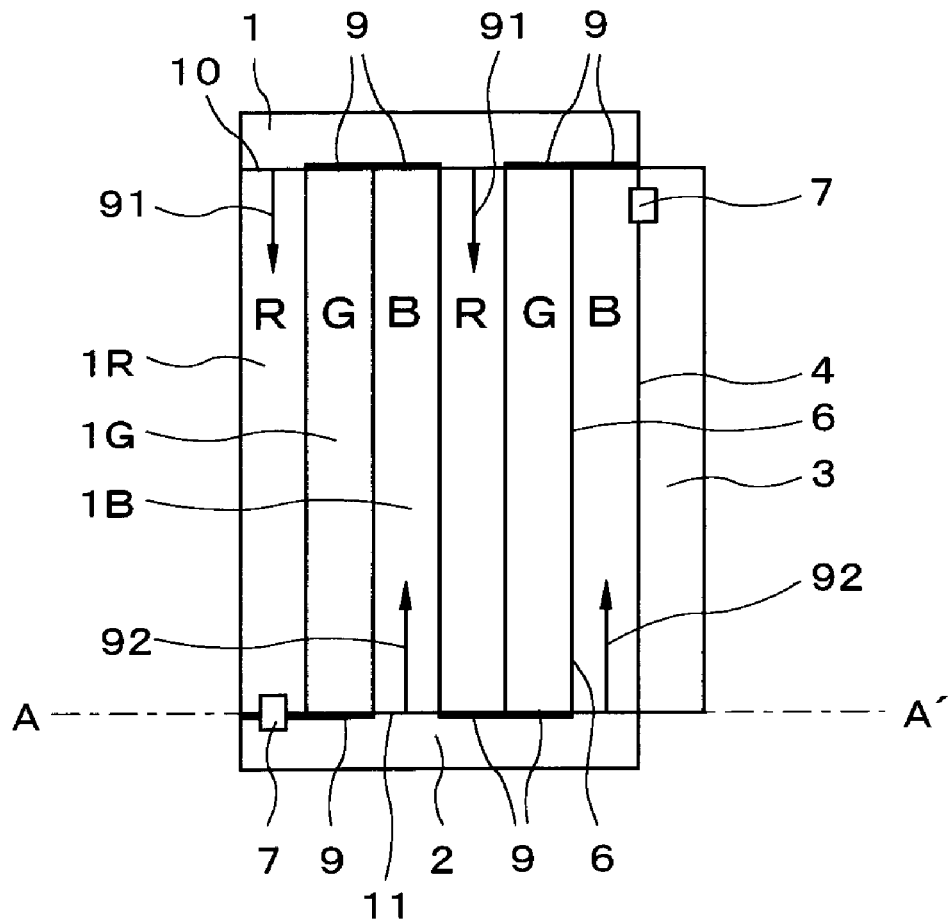
FIG. 2 is a schematic diagram showing a plane structure of a backlight for a color liquid crystal display apparatus according to a first embodiment of the present invention.
Figure 3:
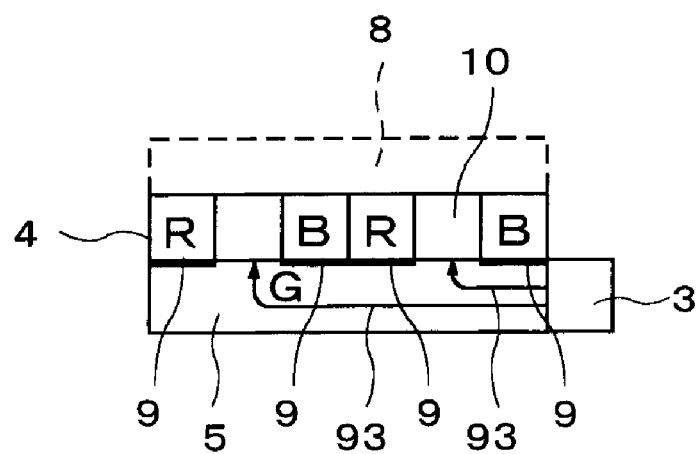
FIG. 3 is a schematic diagram showing a longitudinal sectional structure along A-A' in FIG. 2.

Embodiments of the present invention will be described in detail hereinafter with reference to the accompanying drawings. FIG. 2 is a schematic drawing showing a plane structure of a backlight for a color liquid crystal display apparatus according to a first embodiment of the present invention, and FIG. 3 is a schematic drawing showing a longitudinal sectional structure along A-A' in FIG. 2. A first light-guide plate 4 is stacked on top of a second light-guide plate 5. First (R) areas 1R, second (G) areas 1G, and third (B) areas 1B are provided in alternating fashion to the first light-guide plate 4. The areas are shaped as bands and are oriented in the direction from a first lateral surface 10 to a second lateral surface 11 that is opposite the first lateral surface 10. The first (R) areas 1R, second (G) areas 1G, and third (B) areas 1B have dimensions (width and the like) that correspond to the width of the corresponding red (R) pixels, green (G) pixels, and blue (B) pixels of a liquid crystal (LCD) panel 8 that is disposed on the first light-guide plate 4, and are provided in the corresponding positions.

A red LED(R) 1 for emitting red light from among the three primary colors is disposed on the first lateral side 10 of the first light-guide plate 4, and a blue LED(B) 2 for emitting blue light from the three primary colors is disposed on the second lateral side 11 of the first light-guide plate 4. A light-blocking film 9 is formed on the first lateral surface 10 in regions in contact with the second (G) areas 1G and third (B) areas 1B, excluding the regions in contact with the first (R) areas 1R. Also, a light-blocking film 9 is formed on the second lateral surface 11 in regions in contact with the first (R) areas 1R and second (G) areas 1G, excluding the regions in contact with the third (B) areas 1B. Therefore, only red light from the red LED(R) 1R impinges in the first area (R) of the first light-guide plate 4, and only blue from the blue LED(B) 1B is incident on the third area (B) 1B of the first light-guide plate 4. On the other hand, a light-blocking film is formed on the bottom surface of the first light-guide plate 4, i.e., on the surface in contact with the second light-guide plate 5, in regions in contact with the first (R) areas 1R and the third (B) areas 1B, excluding the regions in contact with the second (G) areas 1G of the first light-guide plate 4. A green LED(G) 3 for emitting green light is disposed on a lateral side of the second light-guide plate 5, e.g., on a lateral side that is orthogonal to the first and second lateral sides 10, 11 of the first light-guide plate 4. Green light from the green LED(G) 3 is thereby made incident on the second light-guide plate 5 and is directed solely to the second (G) areas 1G of the first light-guide plate 4 from the bottom surface of the first light-guide plate 4. Each type of light that is incident on the first (R) areas 1R, second (G) areas 1G, and third (B) areas 1B of the first light-guide plate 4 is emitted from the first (R) areas 1R, second (G) areas 1G, and third (B) areas 1B on the surface of the first light-guide plate 4.

The first (R) areas 1R, second (G) areas 1G, and third (B) areas 1B of the first light-guide plate 4 are divided by grooves and other dividing parts 6 formed on the surface of the first light-guide plate 4, and an arrangement is provided in which the colors emitted from the surface of the first light-guide plate 4 are prevented from mixing with each other. The first light-guide plate 4 can produced so that grooved parts are formed using a mold, and the grooved parts are processed to be able to reflect or block light. Also, a resist is applied to the light-guide plate, and then a resist pattern is formed on the light-guide plate surface outside of the grooved parts via exposure and development treatments. Grooves can also be formed by etching the light-guide plate using the resist pattern as a mask.

Alignment marks 7 are provided to the surface of the first light-guide plate 4. The alignment marks are used so that the first light-guide plate 4 and the LCD panel 8 can be aligned and superposed with high precision. The alignment marks 7 may have a perforated pattern so as to allow viewing therethrough.

Figure 4:
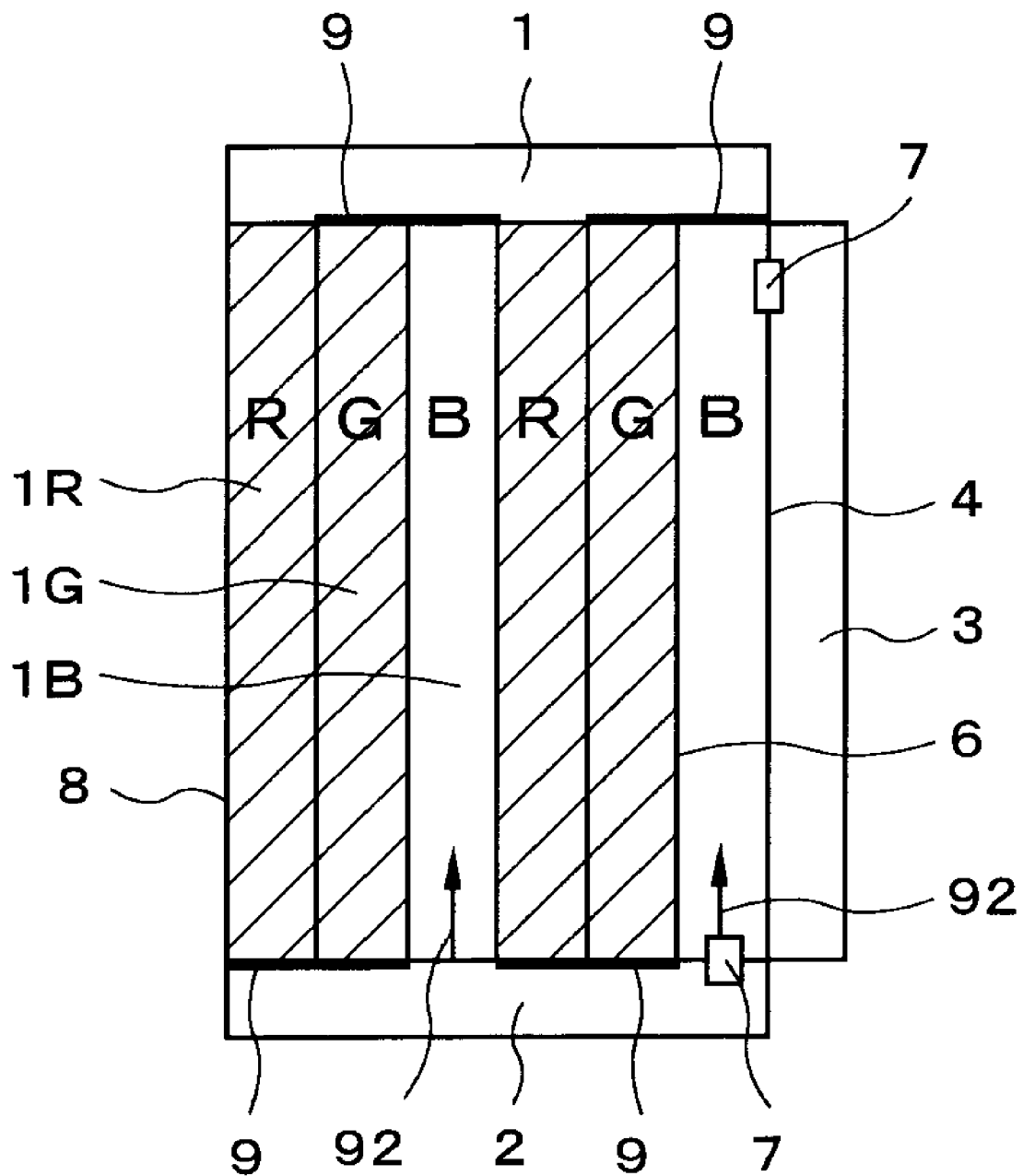
FIG. 4 is a schematic drawing showing the behavior of light from LED(B) 2 in the backlight structure for a color liquid crystal display apparatus according to the first embodiment of the present invention.

Next, the operation of the thus-configured backlight and the liquid crystal display apparatus of the present embodiment will be described. A light-blocking film 9 is formed in regions in contact with the second areas 1G and third areas 1B of the first lateral side 10 of the first light-guide plate 4, and a light-blocking film 9 is formed in regions in contact with the first areas 1R and second areas 1G of the second lateral side 11 of the first light-guide plate 4. Therefore, as shown in FIG. 4, only blue light from the blue LED 2 is incident on the third areas 1B of the first light-guide plate 4. The blue light is emitted from the surface of the first light-guide plate 4 and is made incident directly (without passing through a color filter) on the blue pixels of the LED panel 8. Similarly, in the first areas 1R, red light from the red LED 1 is directed only to the first areas 1R, is emitted from the surface of the first light-guide plate 4, and is made incident directly (without passing through a color filter) on the red pixels of the LED panel 8. Furthermore, green light from the green LED(G) 3 is directed to the second light-guide plate 5, made to enter the first light-guide plate 4 from the bottom surface of the first light-guide plate 4 in which a light-blocking film is provided to the first areas 1R and third areas 1B, and is emitted from the surface of the second areas 1G to impinge directly (without passing through a color filter) on the green pixels of the LED panel 8.

In this manner, light of each color directly enters the pixels of each color on the LCD panel 8 from the first light-guide plate 4. Therefore, a color filter for the LCD panel is not necessary, the transmissivity is improved, and an inexpensive LCD module having high luminance and high efficiency can be obtained. Also, because the three primary colors enter the LCD panel 8 from one LED backlight light-guide plate 4, the light-guide plates and LCD panel are only superposed once and can therefore be fit together with high precision. Furthermore, in the present embodiment, only the first light-guide plate 4 and the second light-guide plate 5 are used as light-guide plates, resulting in a light weight, a small number of steps, and a high yield.

A modification of the first embodiment will next be described. In the first embodiment, an example using two light-guide plates 4 and 5 was described, but it is also possible, for example, to make the green LED(G) 3 in the aforementioned first embodiment into a planar light source, and to place this planar light source below the first light-guide plate 4 in place of the second light-guide plate 5. A construction that uses only one light-guide plate can thereby be obtained without using the second light-guide plate 5. In the first embodiment and the modification thereof, the placement of each LED and area is not limited to that shown in FIGS. 2 and 4, and an arbitrary position can be selected.

Figure 6:
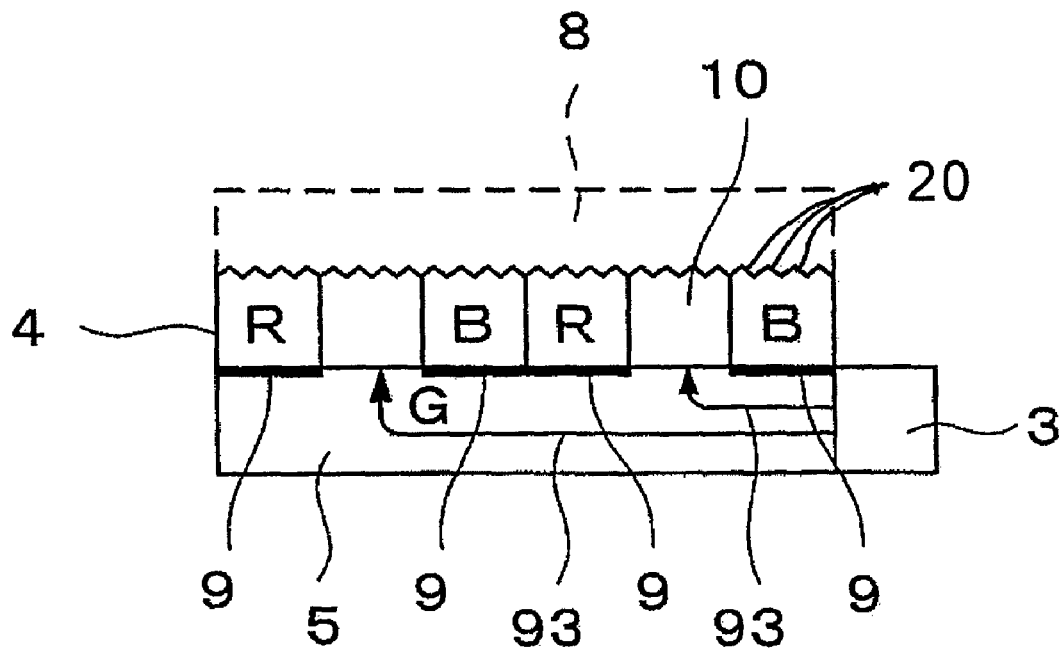
FIG. 6 is a schematic diagram showing a cross-sectional structure according to an alternative embodiment of the present invention illustrating convexities.

Also, prisms 20 formed by aligning bumps, or prisms formed by aligning bumps and dips can be provided to the surface of the first light-guide plate 4, as schematically shown in FIG. 6. With these prisms 20, it is possible to enhance the directivity of light emitted from the first light-guide plate 4.

Also, numerous light-scattering concavities and convexities 20 are formed on the surface of the first light-guide plate 4 as schematically shown in FIG. 6, and light emitted from the first light-guide plate 4 is diffused, whereby the bright spots, dots, bright lines, irregularities, and the like in the light-guide plate can be distributed, the effect thereof can be reduced, and the entire emission surface can be made uniformly bright. It is thereby possible to obtain highly luminescent light, and high efficiency can be achieved.

Figure 7:
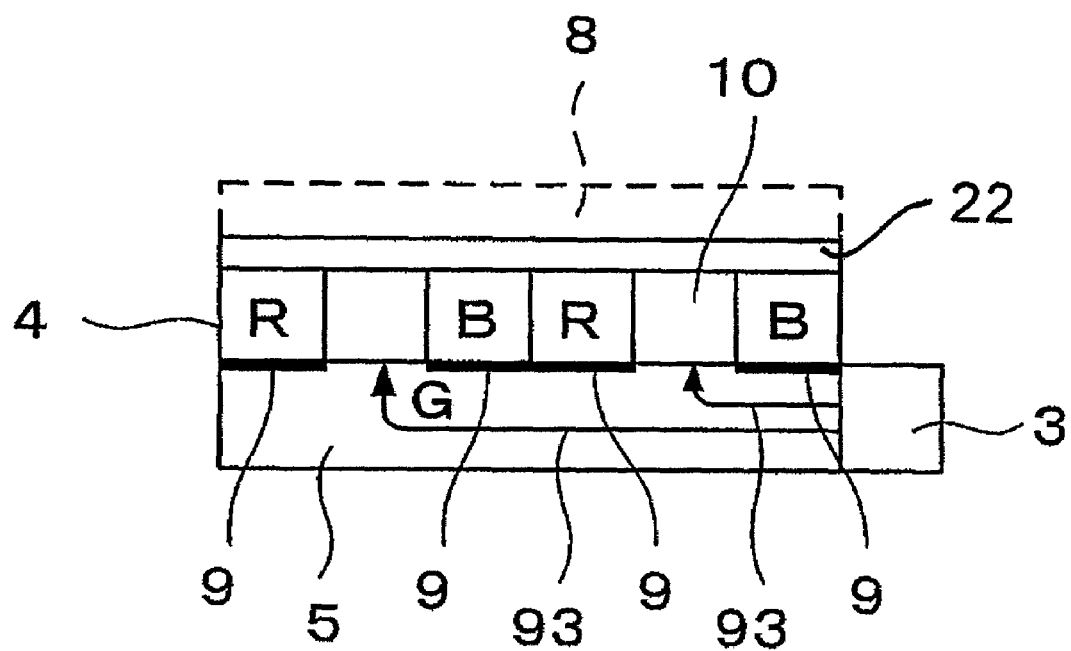
FIG. 7 is a schematic diagram showing a cross-sectional structure according to an alternative embodiment of the present invention illustrating a scattering plate.

A scattering sheet 22 capable of alternating between a scattering state and a transmitting state depending on an electronic signal can also be formed on the surface of the first light-guide plate 4, as schematically shown in FIG. 7. With this scattering sheet 22, it is possible to switch between transmission and scattering of the emitted light from the first light-guide plate 4, depending on the intended application.

Figure 5:
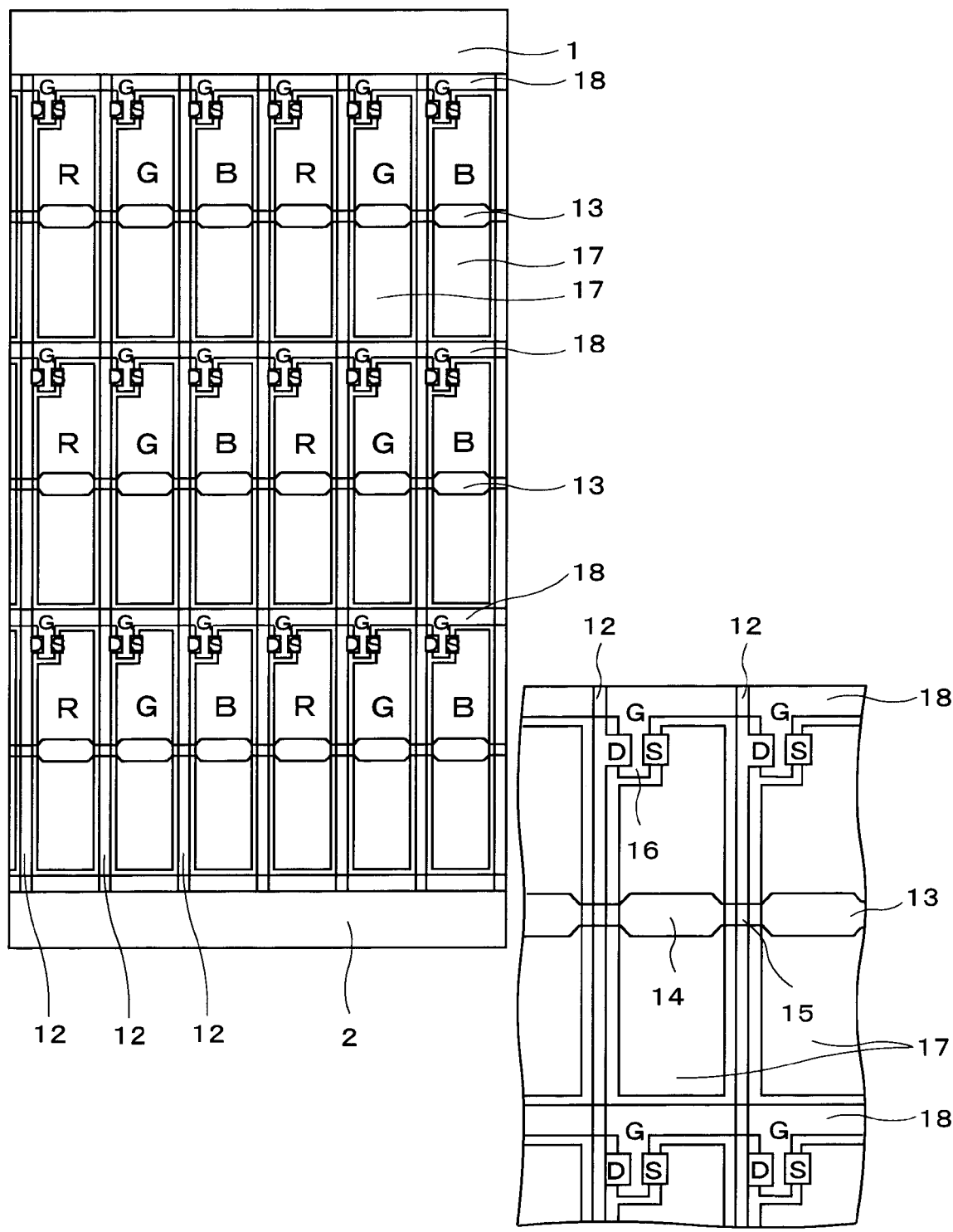
FIG. 5 is a schematic diagram showing a plane structure of a backlight for a color liquid crystal display apparatus according to a second embodiment of the present invention.

FIG. 5 is a schematic drawing showing a plane structure of a backlight for a color liquid crystal display apparatus according to a second embodiment of the present invention. In the aforementioned first embodiment, a TFT pattern is formed on the first light-guide plate 4 to obtain a TFT substrate. Gate wiring 18 and signal wiring 12 are configured as a matrix, TFT 16 is formed at the intersection points, and a pixel electrode 17 is connected to the source electrode (S) of the TFT 16. Dedicated Cs wiring 13 for an electrical capacitance Cs may also be provided on occasion. By making the first light-guide plate into a TFT substrate, the polarity of the drive voltage of the LCD is inverted and AC driving can be performed. It is thereby possible to prevent the physical properties of the material from being modified, resistivity from being reduced, and other degradation phenomena from being caused by the application of DC voltage to the liquid crystal for long periods, allowing the service life of the LCD panel to be extended.

What is claimed is:

1. A backlight for a color liquid crystal display apparatus wherein light of the three primary colors of red, blue, and green is directly incident on the corresponding pixels of a liquid crystal layer, said backlight comprising:
    a first light-guide plate;
    a first incidence part for receiving light of a first primary color from among the light of the three primary colors in a first area on a first lateral surface of the first light-guide plate;
    a second incidence part for receiving light of a second primary color light from among the light of the three primary colors in a second area on a second lateral surface that is opposite to the first lateral surface of the first light-guide plate; and
    a third incidence part for receiving light of a third primary color from among the light of the three primary colors in a third area on a rear surface of the first light-guide plate.

2. The backlight according to claim 1, wherein:
    the first incidence part has a first light-emitting diode that emits light of the first primary color and is provided to the first lateral surface, and a first light-blocking film provided to an area outside of the first area on the first lateral surface;
    the second incidence part has a second light-emitting diode that emits light of the second primary color and is provided to the second lateral surface, and a second light-blocking film provided to an area outside of the second area on the second lateral surface; and
    the third incidence part has a second light-guide plate provided to the rear surface of the first light-guide plate, a third light-blocking film provided to an area outside of the third area on the rear surface, and a third light-emitting diode for emitting light of the third primary color toward the second light-guide plate.

3. The backlight according to claim 2, wherein the area occupied by light of the first primary color received from the first area, the area occupied by light of the second primary color received from the second area, and the area occupied by light of the third primary color received from the third area in the first light-guide plate are disposed in an alternating fashion parallel to each other in the shape of a band as viewed from an emitting surface.

4. The backlight according to claim 1, wherein a prism is formed on the surfaces of the first and second light-guide plates, and directivity of light emitted from the first and second light-guide plates is enhanced.

5. The backlight according to claim 2, wherein a prism is formed on the surfaces of the first and second light-guide plates, and directivity of light emitted from the first and second light-guide plates is enhanced.

6. The backlight according to claim 3, wherein a prism is formed on the surfaces of the first and second light-guide plates, and directivity of light emitted from the first and second light-guide plates is enhanced.

7. The backlight according to claim 1, wherein
concavities and convexities that scatter light are formed on the surfaces of the first and second light-guide plates; and
the light emitted from the first and second light-guide plates is diffused.

8. The backlight according to claim 2, wherein
concavities and convexities that scatter light are formed on the surfaces of the first and second light-guide plates; and
the light emitted from the first and second light-guide plates is diffused.

9. The backlight according to claim 3, wherein
concavities and convexities that scatter light are formed on the surfaces of the first and second light-guide plates; and
the light emitted from the first and second light-guide plates is diffused.

10. The backlight for a color liquid crystal display apparatus according to claim 1, wherein a scattering sheet capable of alternating between a scattering state and a transmitting state depending on an electronic signal is formed on the surfaces of the first and second light-guide plates.

11. The backlight for a color liquid crystal display apparatus according to claim 2, wherein a scattering sheet capable of alternating between a scattering state and a transmitting state depending on an electronic signal is formed on the surfaces of the first and second light-guide plates.

12. The backlight for a color liquid crystal display apparatus according to claim 3, wherein a scattering sheet capable of alternating between a scattering state and a transmitting state depending on an electronic signal is formed on the surfaces of the first and second light-guide plates.

13. A color liquid crystal display apparatus comprising a liquid crystal layer and a backlight for the color liquid crystal display apparatus in which light of the three primary colors of red, blue, and green is directly incident on the corresponding pixels of the liquid crystal layer, the backlight having:
a first light-guide plate;
a first incidence part for receiving light of a first primary color from among the light of the three primary colors in a first area on a first lateral surface of the first light-guide plate;
a second incidence part for receiving light of a second primary color light from among the light of the three primary colors in a second area on a second lateral surface that is opposite to the first lateral surface of the first light-guide plate; and
a third incidence part for receiving light of a third primary color from among the light of the three primary colors in a third area on a rear surface of the first light-guide plate.

14. The apparatus of claim 13, wherein
the first incidence part has a first light-emitting diode that emits light of the first primary color and is provided to the first lateral surface, and a first light-blocking film provided to an area outside of the first area on the first lateral surface;
the second incidence part has a second light-emitting diode that emits light of the second primary color and is provided to the second lateral surface, and a second light-blocking film provided to an area outside of the second area on the second lateral surface; and
the third incidence part has a second light-guide plate provided to the rear surface of the first light-guide plate, a third light-blocking film provided to an area outside of the third area on the rear surface, and a third light-emitting diode for emitting light of the third primary color toward the second light-guide plate.

* * * * *